Sept. 16, 1924.

W. S. JENNINGS 1,508,885

REDUCTION TRANSMISSION

Filed Jan. 14, 1924

W. S. JENNINGS

REDUCTION TRANSMISSION 1,508,885

Filed Jan. 14, 1924      2 Sheets-Sheet 2

Patented Sept. 16, 1924.

1,508,885

UNITED STATES PATENT OFFICE.

WINFIELD SCOTT JENNINGS, OF ANTIGO, WISCONSIN.

REDUCTION TRANSMISSION.

Application filed January 14, 1924. Serial No. 686,129.

*To all whom it may concern:*

Be it known that I, WINFIELD SCOTT JENNINGS, a citizen of the United States, and resident of Antigo, in the county of Langlade and State of Wisconsin, have invented certain new and useful Improvements in Reduction Transmissions; and I do hereby declare that the following is a full, clear, and exact description thereof.

This invention relates to reduction transmissions.

Objects of this invention are to provide a reduction transmission which secures a great reduction with a small number of gears, which is very compact, which is self-contained and which is easy to manipulate and of substantial construction.

An embodiment of the invention is shown in the accompanying drawings, in which:—

Figure 1:
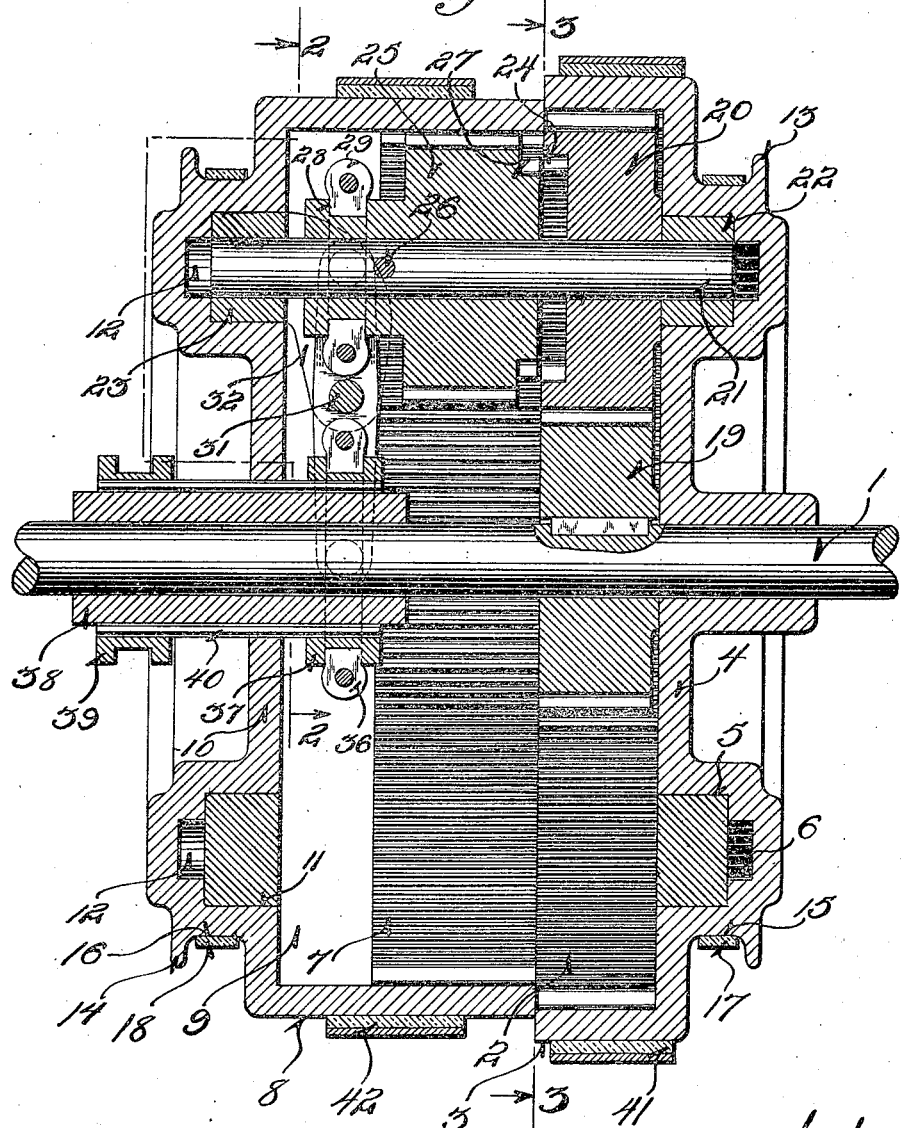
Figure 1 is a sectional elevation through the transmission.

The transmission comprises a driving shaft 1 upon which all of the parts are carried. This driving shaft has loosely mounted thereon a relatively large internal gear 2 provided with a cylindrical outer portion 3 and with a disk-like face 4. This face is provided with an inwardly opening annular groove 5 and with a smaller annular groove 6 which opens into the groove 5. A second internal gear 7 which may be smaller than the gear 2 is provided and arranged in abutting contact with the corresponding face of the gear 2. It is to be noted in this connection that each of the gear structures comprises a cup-like section which, together, form a complete housing for the apparatus. The gear 7 is provided with an outer cylindrical face 8 and it is to be noted that the gear therein does not extend completely across the inside of the last discussed member, but that a space 9 is provided within this shell-like member. The gear 7 is provided with a disk face 10 within which an annular groove 11 is formed. A plurality of cylindrical holes 12 are provided at regular intervals in the disk-like portion 10 and open into the groove 11. If desired, the grooves 5 and 11 of the two main cupshaped gear members may be formed in outwardly projecting portions, and it is to be noted that these outwardly projecting portions may be formed with flanges 13 and 14, respectively, and with pulley faces 15 and 16. These pulleys receive the driven belts 17 and 18, respectively, although it is to be understood that other means of transmitting power from the cup-shaped gear members may be employed.

A pinion 19 is keyed to the shaft 1 and mounted inside of the casing formed by the cup-shaped internal gear members. This pinion meshes with a second pinion 20 which in turn meshes with the internal gear 2. This pinion 20 is carried by a transverse pin 21 and is loose thereon. This pin is slidably carried by rings 22 and 23 which slidably fit the annular grooves 5 and 11. It is to be noted that the groove 6 is of sufficient size to freely receive the pin 21 and permit it to travel around such groove under certain conditions, and that the cylindrical apertures 12 are adapted to receive and form seats for the other end of such pin under other conditions. In the position of the parts shown in Figure 1, the pin is out of engagement with either the groove 6 or the holes 12. This pinion 20 is provided with clutch teeth 24 on its inner side and a second pinion 25, pinned to the shaft 21, as indicated at 26, is similarly provided with cooperating clutch teeth 27.

Figure 2:
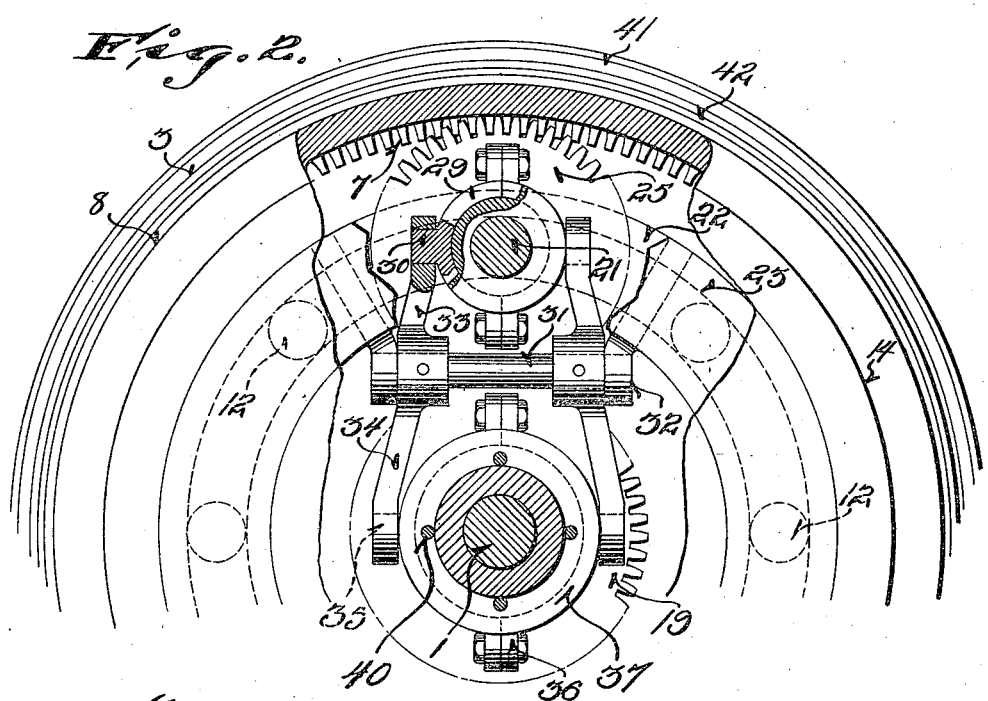
Figure 2 is a fragmentary sectional view on the line 2—2 of Figure 1.
Figure 3:
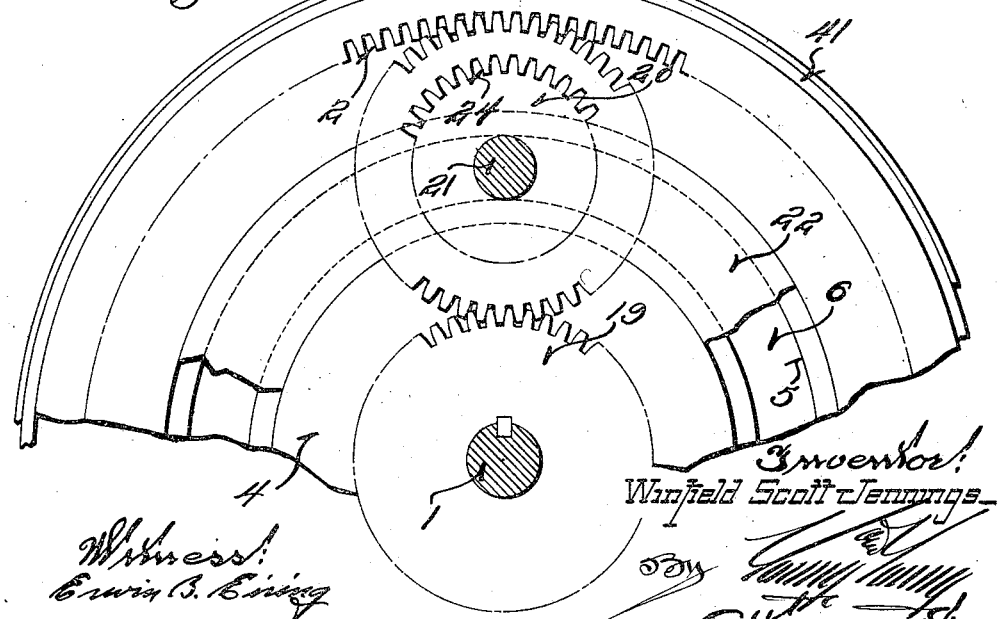
Figure 3 is a corresponding view on the line 3—3 of Figure 1.

Means are provided for shifting the pinion 25 into and out of engagement with the pinion 20, such pinion 25 carrying the shaft 21 with it. The pinion 25 is provided with an extended hub equipped with an annular groove 28. Within this groove a collar 29 is mounted and is provided with outwardly projecting trunnions 30. A pin 31 is carried by lugs 32 integrally formed or otherwise secured to the the annular ring 23, as shown in Figures 1 and 2. This pin carries a pair of levers each of which is provided with upper arms 33 which engage the trunnions 30 and with lower arms 34 which engage corresponding trunnions 35 formed upon a collar 36 concentric with the shaft 1. This collar 36 is slidably carried within an annular groove provided in the collar 37. The collar 37 is mounted upon an inward extension of the housing 38 of the left hand gear member 7 (see Figure 1). The hub 38 is extended outwardly and carries a corresponding groove collar 39. The collars 37 and 39 are connected by a plurality of rods 40 which pass through the disk-like face 10 of the left hand gear shell; thus when the collar 39 is shifted by any suitable means, the collar 37 is correspondingly shifted and the levers rocked so as to move the pinion 25 and the shaft 21 as desired.

Any suitable means may be provided for holding either of the internal gears still under certain conditions of operation. For example, brake bands 41 and 42 may be provided and may be manipulated in any desired manner.

The operation of the apparatus is as follows:—Assuming that the shaft 1 is driving and that the parts are in the position shown in the figures then obviously the pinion 20 will walk around the internal gear 2 carrying the shaft 21 with it and the gear 25 will freely rotate the shaft 21 without imparting motion to the other gear 7. This is a neutral position of the apparatus. However, when it is desired to secure a slow speed of the gear 7, the brake 42 is released and the brake 41 tightened,—it being understood that the terms "brakes" are employed in a very general sense. The gear 25 is shifted by means of the mechanism controlled from the collar 39 and is moved to the right in Figure 1 causing its clutch teeth 27 to lock with the clutch teeth 24 and form in effect an integral union mechanically between the pinion 20 and the pinion 25. As the shaft 1 rotates it will cause the pinion 20 to walk around the internal gear 2 and to carry and rotate the gear 25 with it. It will be noted that the ratio between the diameter of the internal gear 2 and pinion 20 is different from the ratio between the internal diameter of the gear 7 and the diameter of the pinion 25. Therefore, as the number of turns of the pinion 25 is the same as that of the pinion 20, it is obvious that the gear 7 will be shifted with relation to the gear 2, and thus a slow motion will be imparted to the gear 7 when the gear 2 is held stationary. It is to be noted that the right hand end of the shaft 21 freely slides in the groove 6.

A second speed may be imparted to the gear 7 by shifting the pinion 25 and the shaft 21 to the extreme left-hand position while maintaining the gear 2 stationary. Under these conditions the shaft 21 fits within one of the holes 12 and bodily carries the gear 7 around with it as the pinion 20 is walked around the internal gear 2.

Another method of operation is to shift the pinion 25 into engagement with the pinion 20, to tighten the brake band 42, and to release the brake band 41. Under these conditions the gear 7 is held stationary while the gear 2 is allowed to move. Thus when the shaft 1 is rotated, the pinion 20 rotates and causes the pinion 25 to walk around the internal gear 7. This causes a corresponding rotation of the gear 20 about the shaft 1 as an axis and causes a slow motion to be imparted to the gear 2 in a reverse direction to that originally imparted to the gear 7, as previously described.

A second speed may be given to the gear 2 by maintaining the internal gear 7 stationary and by shifting the pinion 25 and shaft 21 to their extreme left hand position thus seating the shaft 21 in one of the holes 12. Under these conditions the shaft 21 is stationary and consequently the pinion 20 merely acts as an idler between the pinion 19 and the internal gear 2.

It will be seen, therefore, that a reduction transmission has been provided in which a very large reduction can be most readily accomplished with a small number of gears and by a very simple construction.

It will further be seen that a number of different speeds of the several parts may be secured and also that although the driving shaft may be rotated, the driven members, that is to say, the internal gears 2 and 7 may remain stationary when the parts are in neutral position.

It is further to be noted that the parts are completely and adequately housed by the construction illustrated, and may be most readily maintained in a suitable oiled condition due to this effective housing.

Although the invention has been described in considerable detail, it is to be understood that the invention may be variously embodied and is, therefore, to be limited only as claimed.

I claim:

1. A reduction transmission comprising a driving shaft, a pair of internal gears carried thereby, a pinion keyed to said driving shaft, and a pair of pinions carried by a shaft having its axis paralleling the driving shaft, said pinions being adapted for mutual inter-locking engagement, one of said pinions meshing with one of said internal gears and with the pinion carried by said driving shaft, the other of said pinions meshing with the other of said internal gears, means for holding either of said internal gears temporarily stationary, and means for moving said mutually engageable pinions into and out of inter-locking engagement.

2. A reduction transmission comprising a driving shaft, a pair of cup-shaped casings loosely mounted thereon and having internal gears, a driving pinion keyed to said shaft, a second shaft freely carried by said casings, a pair of pinions mounted upon such freely movable shaft, one of said pinions meshing with said driving pinion and with one of said internal gears, the other of said pinions meshing with a second internal gear and rigidly secured to said freely movable shaft and adapted to be slid into and out of engagement with said second mentioned pinion, the casing for said second mentioned internal gear being provided with a plurality of holes, and means for shifting said freely movable shaft and said last mentioned pinion laterally whereby said second mentioned shaft may be seated in one of said holes when said last mentioned pinion is disengaged from said second mentioned pinion.

3. A reduction transmission comprising a driving shaft, a pair of cup-shaped casings loosely mounted thereon and having internal gears, a driving pinion keyed to said shaft, a second shaft freely carried by said casings, a pair of pinions mounted upon said freely movable shaft, one of said pinions meshing with said driving pinion and with one of said internal gears, the other of said pinions meshing with a second internal gear and rigidly secured to said freely movable shaft and adapted to be slid into and out of engagement with said second mentioned pinion, the casing for said second mentioned internal gear being provided with a plurality of holes, and means for holding either of said casings temporarily stationary.

In testimony that I claim the foregoing I have hereunto set my hand at Antigo, in the county of Langlade and State of Wisconsin.

WINFIELD SCOTT JENNINGS.